UNITED STATES PATENT OFFICE.

THOMAS B. ALLEN, OF NIAGARA FALLS, NEW YORK, ASSIGNOR TO THE CARBORUNDUM COMPANY, OF NIAGARA FALLS, NEW YORK, A CORPORATION OF PENNSYLVANIA.

COMPOSITION OF MATTER CONTAINING ALUMINA, MAGNESIA, AND BORIC OXID.

1,001,570.   Specification of Letters Patent.   Patented Aug. 22, 1911.

No Drawing.   Application filed November 9, 1910.   Serial No. 591,494.

*To all whom it may concern:*

Be it known that I, THOMAS B. ALLEN, of Niagara Falls, Niagara county, in the State of New York, have invented a new and useful Composition of Matter Containing Alumina, Magnesia, and Boric Oxid, of which the following is a full, clear, and exact description.

My invention is designed to provide a new and useful composition of matter containing the oxids of aluminum, magnesium and boron. This composition is of a crystalline nature and forms abrasive grains which are valuable in grinding and other abrasive processes.

In the manufacture of this new composition of matter, I preferably form a compound of magnesia and boric oxid, and melt this compound with an aluminous ore in an electric furnace, such for example, as shown in United States Letters Patent No. 929,517, granted to F. J. Tone on July 27th, 1909. This furnace is of the arc type, and the mixture may be gradually fed in around the electrodes, and electric current supplied; the melting operation continuing until the molten material is accumulated to the desired amount in the crucible. The current is then turned off and the molten mass allowed to cool, to insure a crystalline product. The solid ingot may then be removed from the furnace and crushed or otherwise treated to give a product suitable for abrasive or other purposes.

In carrying out my process, it is not essential to combine the boric oxid with magnesia; as it may also be combined with alumina and magnesia; and I will hereafter designate this compound of boric acid with magnesia or alumina, or a mixture of magnesia and alumina, as a refractory compound of boric oxid.

I have found that if a mixture of alumina, magnesia and boric oxid be melted directly in an electric furnace, a substantial amount of boric oxid is volatilized; and it is preferable therefore to fix the boric oxid by first combining it with some other material to form a refractory compound as above stated. It is also desirable to keep the temperature of the furnace relatively low, and to use a smothered arc in order to decrease the tendency of the boric oxid to volatilize.

In carrying out my invention, I preferably use calcined bauxite as the source of alumina, and calcined magnesite as the source of magnesia, and boric acid as a source of boric oxid, though I do not wish to limit myself to the use of these materials. Since these materials contain other more easily reducible oxids, I add sufficient carbonaceous material, or other reducing agents, to remove the major portion of these oxids. Such oxids are mainly those of iron, silicon and titanium, and on reduction yield a metallic alloy which may be removed by tapping during and after the furnace operation, or which may be removed from the solidified ingot by any desirable mechanical, electrical, or chemical means, after crushing.

I will now describe a preferred form of carrying out my invention.

I mix boric acid with calcined magnesia, and heat this mixture in a fuel fired furnace. The heating may be conducted in any well-known manner, in such a way as to overcome the tendency of the boric acid to volatilize. The product obtained in this manner is then crushed, and mixed with bauxite and carbon, and this mixture is then melted in the electric furnace. For example, I have taken a mixture of 65 parts of calcined magnesia, and 35 parts of boric acid, these proportions being by weight and heated this mixture to about 1300 degrees in a fuel fired furnace. Twenty-five parts of this product were then mixed with 100 parts of calcined bauxite, and 8 parts of coke, and this mixture was then melted in the electric furnace of the above mentioned type. The product obtained contained 12 per cent. magnesia, 6 per cent. boric oxid, and 79 per cent. alumina, the remainder being the oxids of iron, silicon and aluminum. The product thus obtained is a dark colored crystalline material of great hardness, having a hardness of about 9 in Moh's scale of hardness. It is also very brittle in its nature. Addition of boric acid increased the brittleness, and also increased the hardness of the material. I am able to prepare, therefore, a series of compounds of varying degrees of hardness and toughness, that is, of varying abrasive qualities, by varying compositions of the product.

The advantages of the product are apparent to those skilled in the art, since it is very desirable for certain abrasive purposes to obtain a product having the hardness of artificial crystalline alumina, but being of a much more brittle nature than this product.

I claim:—

1. As a new composition of matter, a homogeneous crystalline product containing alumina, magnesia and boric oxid.

2. As a new composition of matter, a homogeneous crystalline product consisting of the oxids of aluminum, magnesium and boron substantially free from impurities.

3. As a new composition of matter, a homogeneous crystalline product consisting of magnesia and alumina and boric oxid in combination therewith, the product being insoluble in water and acid solutions.

4. The method consisting of melting by electrically developed heat a mixture containing oxids of aluminum, magnesium and boron, and containing carbon.

5. The process of forming the herein described product, which consists of melting by electrically developed heat a mixture containing the oxids of aluminum, magnesium and boron, and carbon, substantially reducing the impurities, allowing the mass to cool, and separating the crystalline product from the impurities.

6. The process of forming the herein described product which consists of melting by electrically developed heat, a mixture containing the oxids of aluminum, magnesium and boron, and a reducing agent, substantially reducing the impurities, allowing the mass to cool, and separating the crystalline product from the impurities.

7. The process of forming the herein described product which consists in forming a refractory compound of boric oxid, and melting by electrically developed heat a mixture of this material with aluminous and magnesious materials, and carbon, substantially reducing the impurities, allowing the mass to cool, and separating the crystalline product from the impurities.

In testimony whereof I have hereunto set my hand.

THOS. B. ALLEN.

Witnesses:
L. B. COULTER,
C. H. GREENWOOD.